United States Patent

[11] 3,622,638

| [72] | Inventors | Henry C. Chitwood;<br>Benjamin T. Freure, both of Charleston, W. Va. |
|---|---|---|
| [21] | Appl. No. | 548,869 |
| [22] | Filed | May 10, 1966 |
| [45] | Patented | Nov. 23, 1971 |
| [73] | Assignee | Union Carbide Corporation |

[54] PREPARATION OF ORTHO-METHYL-SUBSTITUTED PHENOLS
17 Claims, No Drawings

[52] U.S. Cl............................................. 260/621 H,
260/621 R, 260/624 R, 260/626 R
[51] Int. Cl............................................. C07c 39/06
[50] Field of Search............................................. 260/621,
621 H, 606, 449, 621 K, 624

[56] References Cited
UNITED STATES PATENTS

| 2,909,568 | 10/1959 | Gleim............................ | 260/621 X |
| 3,280,201 | 10/1966 | Hamilton et al............. | 260/621 |
| 2,640,084 | 5/1953 | Chitwood et al.............. | 260/621 H |
| 2,503,641 | 4/1950 | Taylor et al................... | 260/621 H |
| 2,000,096 | 5/1935 | Prudhomme................. | 260/449 |

*Primary Examiner*—Leon Zitver
*Assistant Examiner*—Norman P. Morgenstern
*Attorneys*—Paul A. Rose, Louis C. Smith, Jr., Vincent P. Pirri and James W. Badie ABSTRACT: It has been discovered that ortho-methyl-substituted phenols can be produced by the reaction of hydrogen, carbon monoxide or a carbon-monoxide-producing substance and a methyl acceptor under specified reaction conditions and in the presence of a catalyst selected from the group consisting of methyl and platinum group metals. By deliberate adjustment of the reaction conditions ortho-methyl-substituted phenols can be produced to the substantial exclusion of its other isomers, namely meta- and para-methyl-substituted phenols.

PREPARATION OF ORTHO-METHYL-SUBSTITUTED PHENOLS

This invention relates to a method of preparation of ortho-methyl-substituted phenols and is particularly concerned with the preparation of ortho-methyl-substituted phenols to the substantial exclusion of their other isomeric forms, i.e., meta- and/or para-methyl-substituted phenols. In one particular aspect the present invention is directed to the preparation of ortho cresol substantially free from the presence of meta and/or para cresol.

Ortho-methyl-substituted phenols are useful organic compounds which have found numerous laboratory and industrial applications. For example ortho cresol in addition to its usefulness as a chemical intermediate has been widely used in insecticides, plasticizers, stabilizer for rubber, detergents, solvents, motor oil additive, etc. In most laboratory as well as industrial applications where ortho cresol is employed it is desirable and advantageous that ortho cresol be substantially free from the presence of its other isomers, i.e., meta and/or para cresol.

The prior art processes which have heretofore been employed for the production of ortho cresol, or ortho-methyl-substituted phenols, have invariably coproduced the other isomeric forms, often in relatively large amounts. For example, the separation of ortho cresol from coal tar (the principal source of cresol) also results in the simultaneous production of meta and/or para cresol. Frequently, other impurities are present in addition to these isomers which must all be separated from ortho cresol.

It is therefore an object of this invention to provide a method for the preparation of ortho-methyl-substituted phenols without the simultaneous formation and/or production of their other isomers.

It is another object of the present invention to provide a method for the preparation of ortho cresol without the concomitant production of meta and/or para cresol.

It is a further object of this invention to provide a method for producing ortho-methyl-substituted phenols essentially free from impurities as well as other isomeric forms of methyl-substituted phenols.

It is still a further object of the present invention to provide a method for preparing ortho cresol to the substantial exclusion or minimization of its meta and/or para isomers as well as other impurities.

The above and other objects of this invention will become apparent from the following detailed description of the invention and examples.

The present invention in its broadest aspect contemplates reacting hydrogen, carbon monoxide or any substance which releases carbon monoxide under the instant reaction conditions, with a compound hereafter designed as "methyl acceptor" for the sake of simplicity of description and which is selected from the group represented by the following general formulas:

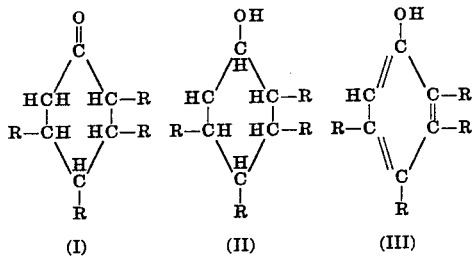

(I)    (II)    (III)

wherein each R represents a hydrogen atom or an alkyl radical containing one to four carbon atoms (lower alkyl) and wherein each two adjacent R radicals together with their respective bonded ring carbon atoms can form a fused carbocyclic ring containing five to six carbon atoms in the nucleus, and wherein further, the carbon atoms in the fused carbocyclic ring which is thus formed can be substituted with more than one substituent which are alkyl radicals containing one to four carbon atoms.

Exemplary methyl acceptors which are contemplated in the practice of this invention are: cyclohexanone (type I) wherein each R represents a hydrogen atom; cyclohexanol (type II) wherein each R again represents a hydrogen atom; phenol (type III) wherein each R represents a hydrogen atom; ortho cresol wherein the substituted carbon atom adjacent to the hydroxyl-containing carbon atom in the formula depicted by type III contains a methyl radical.

Exemplary methyl acceptors wherein the two adjacent R radicals together with their respective bonded benzenoid carbon atoms form a fused, five-member ring are indanols such as 4-indanol and 5-indanol represented, respectively by the following formulas:

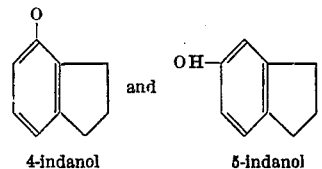

4-indanol    5-indanol

Other exemplary indanols include 3-methyl-4-indanol, 2-ethyl-4-indanol, 1,3-dimethyl-4-indanol, 1-butyl-4-indanol, 1-methyl-6-ethyl-4-indanol, 3-ethyl-5-indanol, 2-propyl-5-indanol, 1,2-diethyl-5-indanol, 1,4-dimethyl-5-indanol, 2-butyl-5-indanol, 1,7-dimethyl-5-indanol, etc.

Examples of methyl acceptors wherein the two adjacent R radicals together with their respective bonded benzenoid carbon atoms form a fused, six-member ring are naphthols, such as 1-naphthol and 2-naphthol represented respectively by the following formulas:

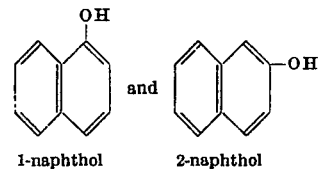

1-naphthol    2-naphthol

Other suitable naphthols include 6,7-dimethyl-1-naphthol, 5-butyl-1-naphthol, 8-ethyl-1-naphthol, 3,5,7-trimethyl-1naphthol, 3,6-dimethyl-2-naphthol, 4,7,8-trimethyl-2-naphthol, 7-butyl-2-naphthol, 5,7-diisopropyl-2-naphthol, etc.

Further examples of methyl acceptors wherein the two adjacent R radicals together with their respective bonded benzenoid carbon atoms form a fused, six-member ring are represented by the tetralones such as 1-tetralone and 2-tetralone represented respectively by the following formulas:

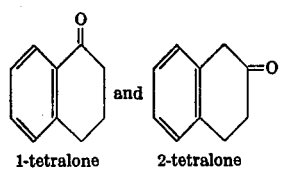

1-tetralone    2-tetralone

The term methyl acceptor as employed herein has reference to the fact that the compounds depicted by the foregoing formulas undergo the instant reaction to thereby add a methyl group to their nucleus. The present invention resides in the discovery that under the reaction conditions employed herein the methyl group attaches in the ortho position with little or no formation of the meta- and/or para-substituted isomeric products.

As was previously mentioned the instant invention contemplates reacting a methyl acceptor with hydrogen and carbon monoxide or any substance which produces carbon monoxide under the reaction conditions maintained in the practice of this invention. Exemplary compounds which produce carbon monoxide under the instant reaction conditions are primary saturated aliphatic alcohols containing one to 12 carbon atoms, preferably one to six carbon atoms; the esters corresponding to said primary saturated aliphatic alcohols, saturated aliphatic aldehydes containing one to 12 atoms preferably one to six carbon atoms; formic acid; aromatic aldehydes and alkyl-substituted aromatic aldehydes containing seven to about 20 total carbon atoms, preferably seven to 12 total carbon atoms examples of which include benzaldehyde and tolualdehyde; alkarylaldehyde represented by the general formula

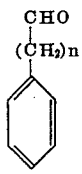

wherein n is an integer from 1 to about 8 preferably 1 to 4 examples of which include phenylacetaldehyde and phenylpropionaldehyde wherein n in the above formula is 1 and 2 respectively; alkylene glycols conforming to the general formula

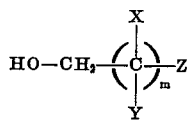

wherein m is an integer varying from 1 to about 10, preferably 1 to 4, and X, Y and Z are selected from the group consisting of hydrogen, hydroxyl and lower alkyl and wherein at least one of said X, Y and Z is a hydroxyl group. Illustrative alkylene glycols which conform to the foregoing general formula include ethylene glycol, propylene glycol, 1,3-propanediol, 1,4-butanediol, 2-ethyl-1,3-butanediol, 2-ethyl-1,3-butanediol, 1,4-hexanediol, 2-methyl-1,5-pentanediol, 2,4-dimethyl-1,9-dodecanediol, 6-butyl-1,7-decanediol, etc.

Examples of primary saturated aliphatic alcohols are methanol, ethanol, butanol, pentanol, hexanol, heptanol, octanol, decanol, etc. The esters corresponding to said primary aliphatic alcohols are well known. They include methyl acetate and ethyl acetate. Cellosolve (monomethyl ether of ethylene glycol) can also be suitably employed in the practice of this invention.

Exemplary saturated aliphatic aldehydes are formaldehyde, acetaldehyde, propionaldehyde, butyraldehyde, etc.

The instant reactions are effected in the vapor phase, at elevated temperatures and in the presence of catalyst such as those described in U.S. Pat. Nos. 2,588,359 or 2,503,641. The catalyst described in the former patent consists essentially of nickel, copper, mostly in the form of metallic copper; chromium mostly in the form of its oxide; and alkali metal sulfate of the group consisting of lithium sulfate, sodium sulfate, potassium sulfate, rubidium sulfate and cesium sulfate in the relative amounts therein disclosed. This catalyst, hereinafter referred to as "nickel-containing catalyst," is preferably supported on porous, ceramically-bonded silica, or other suitable support materials. The catalyst described in U.S. Pat. No. 2,503,641 comprises a platinum group metal in the metallic state and alkali compound and will hereafter be referred to as platinum catalyst.

In addition to the foregoing catalyst, nickel itself, preferably supported on an alumina, alumina-silica, or other suitable support materials (hereafter nickel catalyst) have also been found effective catalysts for the instant reactions.

The reactions of this invention are carried out at elevated temperatures of from about 300° C. to about 400° C., preferably from about 340° C. to about 375° C. The pressure is not narrowly critical, though pressures ranging from about 0.5 atmosphere to about 5.0 atmospheres, preferably from about 1 atmosphere to about 3 atmospheres are more advantageous.

The molar ratio of the reactants can vary depending, inter alia, upon the particular reactants. Thus, the ratio of the methyl acceptor to the carbon-monoxide-producing compound can vary from about 10:1 to about 1:10, preferably from about 1:1 to about 1:4. It is advantageous to carry out the reaction with a slight excess of the carbon-monoxide-producing compound.

The present reaction is carried out in the presence of at least stoichiometric quantities of hydrogen relative to carbon monoxide or the carbon-monoxide-producing substance. Thus hydrogen must be present at all times in stoichiometric excess such that the molar ratio of hydrogen to carbon monoxide or the carbon-monoxide-producing substance is at least about 3:1 and preferably from about 3:1 to about 12:1.

The total feed rate to the reaction zone can also vary over a relatively wide range depending upon the reaction temperature, the reactants and their relative ratio in the feed. Thus the total feed rate can vary so that the residence time of the reactants in the reaction zone is from about 1 to about 20 seconds, preferably from about 2 to about 15 seconds and most preferably from about 5 to about 10 seconds.

The invention will now be further illustrated by the following examples.

In these examples, the equipment employed and the experimental procedure which was followed were substantially the same. In all cases, the catalyst was charged to a reactor consisting of 1-inch O.D. stainless steel pipe which was 48 inches long. The reactor was jacketed with a 3-inch O.D. pipe partially filled with Dowtherm (a mixture of 75 percent diphenyl ether and 25 percent diphenyl), a well-known commercial heat transfer fluid. The reactor temperature was controlled automatically and the reactants were fed to the reactor by an electrically driven pump. The reaction products were condensed and collected in a receiver and then analyzed by gas chromatography to determine their compositions.

EXAMPLE 1

A feed mixture of methanol and cyclohexanone in a 2:1 mole ration (39.5 weight-percent methanol and 60.5 weight-percent cyclohexanone) was fed to the reactor at the rate of 300 ml./liter catalyst/hr. The reactor contained the catalyst described in U.S. Pat. No. 2,588,359. This was basically nickel, copper (mostly in the form of metallic copper), chromium (mostly in the form of its oxide), and an alkali metal sulfate (sodium sulfate) supported on porous ceramically bonded silica.

Hydrogen was also fed to the reactor at the rate of 280 l./liter catalyst/hr. and the reaction was carried out at a temperature of 355° C.–360° C. for approximately 50 hours. The reaction product was analyzed by gas chromatography and was found to consist of cresol, phenol and anisole. The yield of cresol based on cyclohexanone was 14.5 mole percent. Furthermore, 82.5 mole percent of the cyclohexanone was converted to phenol and the remaining 2 percent was converted to anisole. The cresol was identified as ortho-cresol. There was no detectable amounts of meta and/or para cresol formed in the reaction.

EXAMPLE 2

The feed mixture in this example consisted of cyclohexanol and methanol in a 2.88:1 mole ratio (10 weight-percent methanol). This mixture was fed to the reactor at the rate of 150 ml./liter catalyst/hr. together with hydrogen at the rate of 140 l./liter catalyst/hr. and the reaction was carried out at 360° C. for a period of 30 hours. The catalyst was the same as the catalyst charged to the reactor in example 1.

Analysis of the product showed 13.75 weight-percent orthocresol, 84.2 weight-percent phenol, 1.0 percent cyclohexanone and traces of anisole. There were no detectable amounts of meta and/or para cresols.

EXAMPLE 3

A feed mixture consisting of 40.5 weight-percent methanol and 59.5 weight-percent phenol (2:1 mole ratio of methanol to phenol) was charged to the reactor at the rate of 300 ml./liter catalyst/hr. The reactor contained the catalyst described in example 1 and the reaction was carried out at 360° C. for 6 hours. The product consisted of phenol, orthocresol, cyclohexanone, anisole. Ortho-cresol constituted 15 weight-percent of the product which had no detectable amounts of meta and para cresols.

EXAMPLES 4–7

The feed mixture in all these examples consisted of methanol and cyclohexanone. The catalyst was the same as the catalyst described in example 1 and the reaction in all cases was carried out at 360° C. The purpose of these examples was to demonstrate that ortho-cresol can be produced in practical yields by varying the composition of the feed. These results are shown in table 1 below.

TABLE 1

| Example No. | Methanol in feed, wt. percent | Mol ratio, cyclohexanone/ methanol | Feed rate, ml./l./hr. | Composition of product (percent) | | |
|---|---|---|---|---|---|---|
| | | | | Cyclohexanone | Phenol | o-Cresol |
| 4 | 5 | 6.3 | 150 | 3.5 | 93.6 | 1.8 |
| 5 | 10 | 3.0 | 150 | 2.2 | 90.7 | 6.4 |
| 6 | 14 | 2.0 | 300 | 10.5 | 80.8 | 5.3 |
| 7 | 24.5 | 1.0 | 300 | 2.5 | 83.6 | 10.5 |

EXAMPLE 8

A feed mixture consisting of methanol and cyclohexanone in a 2:1 mole ratio was charged to the reactor at the rate of 250 ml./liter catalyst/hr. together with hydrogen at the rate of 300 l./liter catalyst/hr. The reactor contained a platinum catalyst such as the catalyst described in U.S. Pat. No. 2,503,641 which catalyst contained 1 percent platinum, 0.65 percent sodium and 0.3 percent sulfate on an alumina support. The reaction was carried out at 360° C. for 24 hours and the product when analyzed showed 90.5 weight-percent phenol, 3.4 percent ortho-cresol, 1.1 percent cyclohexanone and 0.50 percent anisole. There were no detectable amounts of para and/or meta cresol.

Example 8 demonstrates that the platinum catalyst when used in the reactions described in this invention results in practical yields of ortho-cresol. However, it can be noted from a comparison between example 8 and the preceding examples that nickel-containing catalysts are superior in the practice of this invention.

EXAMPLE 9

The feed mixture in this was was isobutanol and cyclohexanone in a 1:2 mole ratio. It was fed to the reactor at the rate of 150 ml./liter catalyst/hr. along with hydrogen at the rate of 140 l./liter catalyst/hr. The catalyst in the reactor was the same as the catalyst described in example 1. The reaction was carried out at 360° C. for 48 hours and ortho-cresol was obtained in a yield corresponding to 62 weight-percent.

In this example propane was formed in the blow-off gas and the isobutanol was apparently totally decomposed. That portion of isobutanol which did not react to form cresol was accounted for in the gas stream.

There were no detectable amounts of para and/or meta cresol produced in this reaction.

EXAMPLE 10

The feed to the reactor in this example consisted of cyclohexanone which was fed at the rate of 125 ml./liter catalyst/hr., hydrogen at the rate of 150 l./liter catalyst/hr. and carbon monoxide at the rate of 8 l./liter catalyst/hr. The catalyst was the same as in example 1 and the reaction was carried out at 360° C. for 50 hours. Ortho-cresol was produced in a yield corresponding to 60 percent based upon the carbon monoxide fed to the reactor. Eighteen percent of the carbon monoxide was hydrogenated to methane, 9 percent of the carbon monoxide participated in the water gas reaction and the balance passed through the reactant unchanged.

There were no detectable amounts of para and/or meta cresol in this example.

EXAMPLES 11–15

In these examples the feed consisted of cyclohexanone and a carbon-monoxide-producing substance. The feed was passed through the reactor which contained the catalyst described in example 1. The feed rate in all cases was 150 ml./liter catalyst/hr. together with hydrogen which was fed at the rate of 150 l./liter catalyst/hr. The reaction was carried out at 360° C. for 3–6 hours in each case. The results are shown in table 2.

TABLE 2.—REACTION OF CYCLOHEXANONE WITH VARIOUS SUBSTANCES

| Example No. | Compound used as CO source | Mole ratio, cyclohexanone/ compound | Product compositions, wt, percent | | | | |
|---|---|---|---|---|---|---|---|
| | | | Benzene or other lows | Cyclohexanone | Phenol | o-Cresol | Other |
| 11 | Methyl formate | 2 | 1.78 | 1.37 | 80.2 | 16.6 | |
| 12 | Benzaldehyde | 2 | ¹ 28.4 | 1.0 | 63.7 | 6.1 | 0.76 |
| 13 | Ethylene glycol | 2 | 2.0 | 1.1 | 78.7 | 17.3 | 0.86 |
| 14 | Cellosolve | 2 | ² 8.6 | 1.1 | 73.3 | 14.9 | 2.00 |
| 15 | Butyl acetate | 2 | 0.3 | 0.8 | 70.1 | 26.6 | ³ 0.8 |

¹ From benzaldehyde.
² Methyl ethyl ether.
³ Butyl acetate.

EXAMPLE 16

The feed mixture in this case was 1-tetralone (3,4-dihydro-1-naphthalenone) and methyl formate in a 2:1 mole ratio. This feed was passed through the reactor containing the catalyst described in example 1 at the rate of 250 ml./liter catalyst/hr. The reaction was carried out at 360° C. for 5 hours. The product contained 75 percent 1-naphthol and 16 percent 2-methyl-1-naphthol, along with minor amounts of other components.

EXAMPLE 17

The feed mixture in this case was ortho-cresol and methanol in a 2:1 mole ratio which was passed through the reactor at the rate of 250 ml./liter catalyst/hr. The reaction was carried out at 360° C. in 100 hours. The catalyst in this example was the same as the catalyst which was described in example 1. The product contained 15 percent of 2,6-xylenol and about 85 percent ortho-cresol. There were no detectable amounts of para and/or meta cresol.

EXAMPLE 18

Ortho-cresol, hydrogen and carbon monoxide were fed to the reactor at the rate of 167 ml./liter catalyst/hr., 47.2 l./liter/hr. and 94.5 l./liter/hr., respectively. The reactor in this example was charged with Harshaw Ni-0104, a commercial catalyst manufactured by the Harshaw Chemical Company. This catalyst comprises 58 weight-percent nickel on kieselguhr. The reaction was effected at 270° C.

The cresol was recovered unreacted in this example and no 2,6-xylenol was formed.

EXAMPLE 19

The feed mixture in this example was cyclohexanone hydrogen and carbon monoxide which were fed to the reactor at the rate of 150ml./l./hr., 150 l./l./hr. and 8 l./l./hr., respectively. The catalyst consisted of nickel, chromium and sodium sulfate supported on porous ceramically bonded alumina and the reaction was carried out at 275° C.–310° C. The catalyst was reactivated by oxidation and reduction after a short time and the operation was resumed at a reaction temperature of 350° C. at the foregoing feed rates.

There was no ortho-cresol or 2-methylcyclohexanone detected in the reaction products.

EXAMPLE 20

A mixture of cyclohexanone, hydrogen, and carbon monoxide was passed over a commercially available catalyst, containing 33 weight-percent nickel on an aluminum support, at 275°–300° C., at the rates of 250 ml./l./hr., 250 l./l./hr. and 13.7 l./l./hr., respectively, for 18 hours. Ortho-cresol was obtained in concentration of 14–24 percent in the crude product. Anisole and 2,6-xylenol were obtained as minor byproducts. No meta or para cresol could be detected.

We claim:

1. A method of preparing ortho-methyl-substituted phenols which comprises reacting in the vapor phase, a methyl acceptor, hydrogen, and a compound selected from the group consisting of carbon monoxide and a carbon-monoxide-producing substance at a temperature of from about 300° C. to about 400° C. in the presence of a catalyst selected from the group consisting of nickel and platinum group metals for a residence time of from about 1 to about 20 seconds, maintaining at least a stoichiometric ratio of hydrogen to carbon monoxide and a molar ratio of methyl acceptor to carbon monoxide of from about 10 to 1 to about 1 to 10; said methyl acceptor being selected from the group consisting of compounds conforming to the following general formulas:

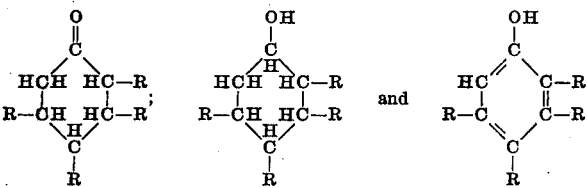

wherein R in said formulas is selected from the group consisting of hydrogen and lower alkyl radicals containing one to four carbon atoms, or wherein two adjacent R groups together with their respective bonded ring carbon atoms form a fused five- or six-member carbocyclic ring; said carbon-monoxide-producing substance being selected from the group consisting of (a) formic acid, (b) primary alkanols containing one to 12 carbon atoms, (c) the acetates and formates of said primary alkanols, (d) alkanals having one to 12 carbon atoms (e) aromatic hydrocarbyl aldehydes containing seven to 20 carbon atoms, (f) alkylene glycols conforming to the general formula

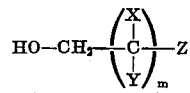

wherein $m$ is an integer varying from 1 to about 10, X, Y, and Z are selected from the group consisting of hydrogen, lower alkyl and hydroxyl radicals wherein one of said X, Y and Z is a hydroxyl group, and (g) monomethyl ether of ethylene glycol; and recovering the ortho-methyl-substituted phenol from the reaction products.

2. The method of claim 1 wherein the reaction temperature is from about 340° C. to about 375° C.

3. The method of claim 1 wherein in the formulas depicting said methyl acceptor each two adjacent R groups together with their respective bonded ring carbon atoms form a fused, five-member carbocyclic ring.

4. The method of claim 1 wherein in the formulas depicting said methyl acceptor each two adjacent R groups together with their respective bonded ring carbon atoms form a fused, six-member carbocyclic ring.

5. The method of claim 1 wherein the ratio of said methyl acceptor to said carbon monoxide or carbon-monoxide-producing substance is from about 1:1 to about 1:4 and wherein the reaction is carried out in the presence of at least from about 3:1 to about 12:1 mole ratio of hydrogen to carbon monoxide or carbon-monoxide-producing substance.

6. The process of claim 1 wherein the residence time of the materials in the reaction zone is from about 2 to about 15 seconds.

7. The process of claim 1 wherein the residence time of the materials in the reaction zone is from about 5 to about 10 seconds.

8. The process of claim 5 wherein the residence time of the materials in the reaction zone is from about 2 to about 15 seconds.

9. The process of claim 5 wherein the residence time of the materials in the reaction zone is from about 5 to about 10 seconds.

10. The process of claim 1 wherein said methyl acceptor is cyclohexanone and wherein said carbon-monoxide-producing substance is methanol.

11. The process of claim 1 wherein said methyl acceptor is cyclohexanol and wherein said carbon-monoxide-producing substance is methanol.

12. The process of claim 1 wherein said methyl acceptor is phenol and wherein said carbon-monoxide-producing substance is methanol.

13. The process of claim 1 wherein said methyl acceptor is cyclohexanone and wherein said carbon-monoxide-producing substance is benzaldehyde.

14. The process of claim 1 wherein said methyl acceptor is cyclohexanone and wherein said carbon-monoxide-producing substance is butyl acetate.

15. The process of claim 1 wherein said methyl acceptor is cyclohexanone and wherein said carbon-monoxide-producing substance is ethylene glycol.

16. The process of claim 1 wherein said methyl acceptor is cyclohexanone and wherein said carbon-monoxide-producing substance is methyl formate.

17. The process of claim 1 wherein said methyl acceptor is 1-tetralone and wherein said carbon-monoxide-producing substance is methyl formate.

\* \* \* \* \*